Figure 1B:
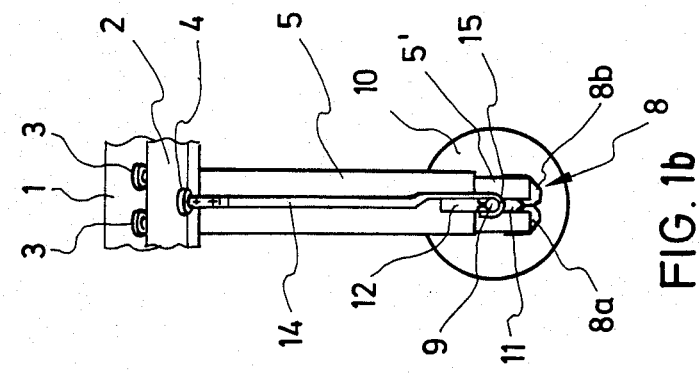

United States Patent [19]

Veith et al.

[11] Patent Number: 4,709,870
[45] Date of Patent: Dec. 1, 1987

[54] DEVICE FOR REPLACEABLY SUSPENDING THE WINDING SHAFT OF A BALE OF CLOTH

[75] Inventors: Gustav G. Veith; Götz U. Veith, both of Frasdorf, Fed. Rep. of Germany

[73] Assignee: Gustav Georg Veith GmbH & Co., Fed. Rep. of Germany

[21] Appl. No.: 846,965

[22] Filed: Apr. 1, 1986

[30] Foreign Application Priority Data

May 31, 1985 [DE] Fed. Rep. of Germany ....... 3519591

[51] Int. Cl.$^4$ ............................................ B65H 16/06
[52] U.S. Cl. ..................................... 242/68; 242/68.4; 242/58.6
[58] Field of Search ................. 242/55, 68, 58.6, 68.4, 242/78.6, 79, 129.6, 129.62; 414/433, 911; 269/46; 83/649; 294/102.1, 67.3; 270/31

[56] References Cited

U.S. PATENT DOCUMENTS

| | | | |
|---|---|---|---|
| 901,925 | 10/1908 | Thompson | 294/102.1 X |
| 2,760,413 | 8/1956 | Colliva | 242/79 X |
| 3,173,678 | 3/1965 | McDowell | 242/58.6 X |
| 3,203,638 | 8/1965 | Theodosiou | 242/68.4 X |
| 3,258,136 | 6/1966 | Rockstrom et al. | 242/58.6 X |
| 3,926,468 | 12/1975 | Kondo | 294/102.1 |
| 4,088,049 | 5/1978 | Benedict | 83/649 X |
| 4,493,460 | 1/1985 | Buss | 242/68.4 X |

FOREIGN PATENT DOCUMENTS 655404  4/1929  France .................................. 242/68

Primary Examiner—John M. Jillions
Attorney, Agent, or Firm—Darby & Darby

[57] ABSTRACT

A device is described, which is provided with a bearing assembly for rotatably supporting a winding shaft of a bale of cloth, said bearing assembly being adapted to be used for automatically taking hold of and again releasing the winding shaft in a simple manner. For this purpose, the bearing means is divided into two parts, said parts being arranged on either side of a slot in a member which is adapted to be displaced in the vertical direction, and the slot receiving the winding shaft therein. In the case of a preferred embodiment, the bearing assembly has two rolls on axles which are displaceably supported in elongated openings. The elongate openings extend on either side of the slot at an oblique angle upwards and outwards and are formed in two bent levers and rotaty plates, respectively, the respective bent levers and rotary plates being arranged diagonally to each other. Due to the movement of the bearing means relative to the winding shaft, the rolls are displaced such that in a first position, i.e. when the winding shaft lies in the bearing means, they block the slot so that the winding shaft is held in a reliable manner. By pivoting the openings into a second, almost horizontal position, the rolls can be pushed aside by the winding shaft and the winding shaft is released. In the case of reloading, the winding shaft exerts a pressure against the rolls from below and displaces the rolls again along their openings in such a way that the slot permitting passage of the winding shaft is opened.

10 Claims, 11 Drawing Figures

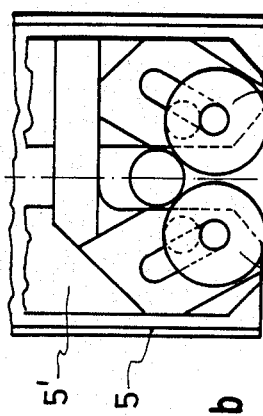
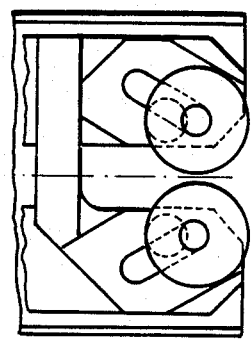
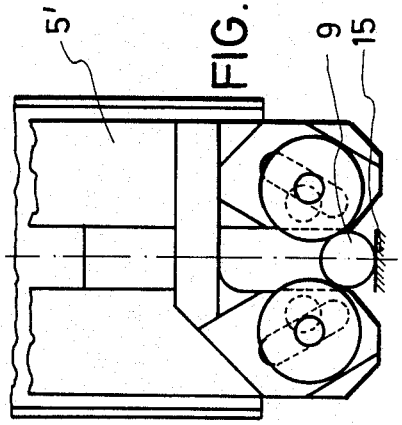
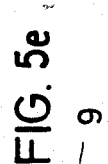
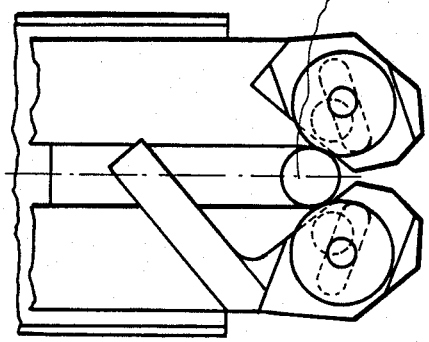
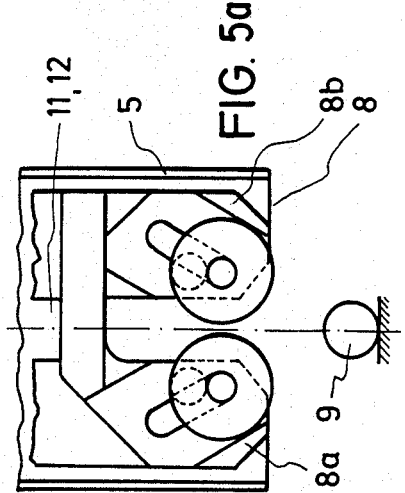
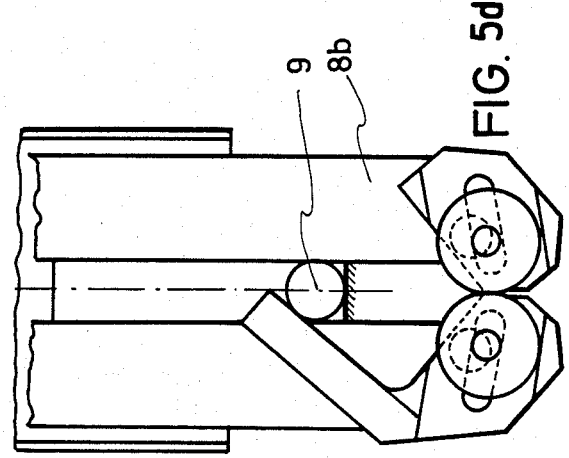

DEVICE FOR REPLACEABLY SUSPENDING THE WINDING SHAFT OF A BALE OF CLOTH

DESCRIPTION

The present invention refers to a device for replaceably suspending the winding shaft of a bale of cloth.

German-pat. No. 21 28 315 discloses this type of device in the case of which a suspension arm is provided engaging the underside of the winding shaft from above. However, this suspension arm only serves the purpose of receiving the winding shaft when the bale is being exchanged. The bearing means for rotatably receiving therein the winding shaft is, however, accommodated in a pivotable frame member operating independently of the suspension arm. The pivotable bearing means can be pivoted upwards and downwards for loading and unloading the device provided with said bearing means so that the suspension arm is brought into and out of engagement with the winding shaft. Such an operating principle, however, necessitates that the suspension arm is secured in position in horizontally spaced relationship with the winding shaft. If, for the purpose of exchanging the bale of cloth, the bearing means is pivoted away from the winding shaft, the winding shaft will have to be held by the operator, since, otherwise, it will swing to a position in which the suspension arms extend perpendicularly. This swinging back would have the effect that an undesirable tension is applied to the material which has already been spread. Moreover, it is necessary to lift the winding shaft off the suspension arms by hand.

Hence, the present invention is based on the task of further developing a device of the above-mentioned type in such a way that, on the basis of a very simple structural design, it operates without any superfluous manipulations by hand being required and that it can be used for a large variety of purposes.

Due to the structural design according to the invention, the bearing means itself takes hold of the winding shaft and guides said winding shaft into the position required. The gripping movement is carried out automatically due to a movement of the bearing means relative to the winding shaft so that manipulations by hand are no longer necessary (with the exception of the actuation of the control means). The risk of unintentionally applying undesired tension to the material is avoided.

Figure 1A:
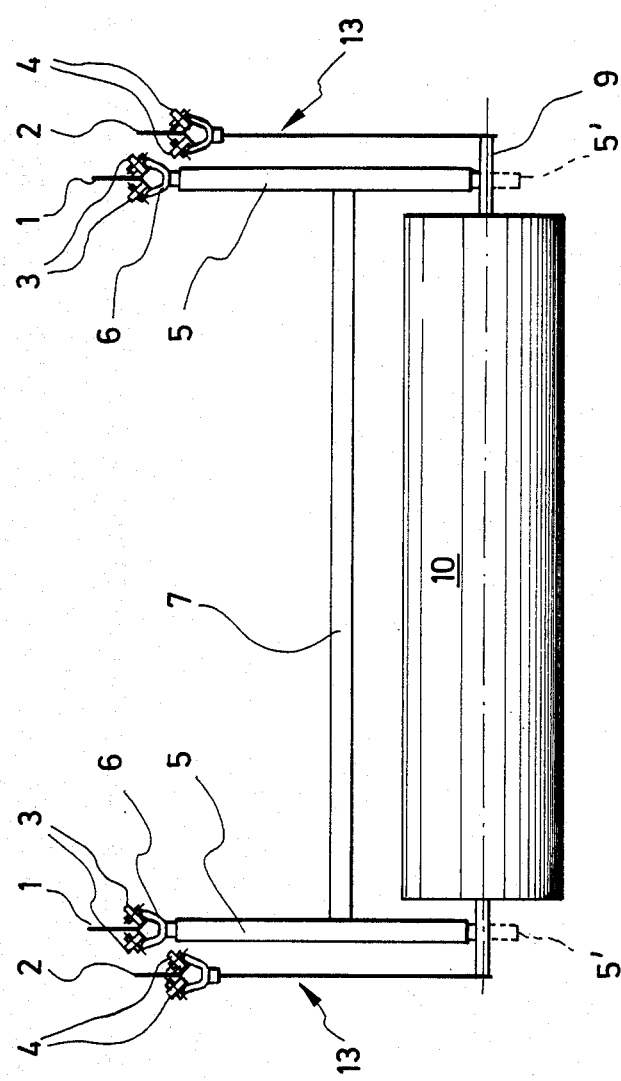
Figure 2:
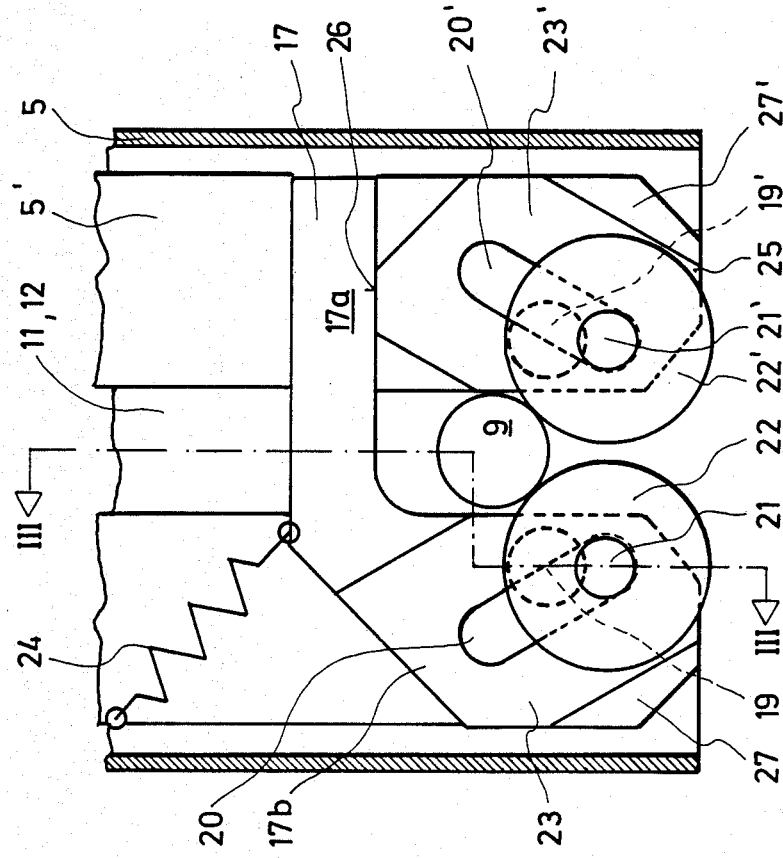
Figure 3:
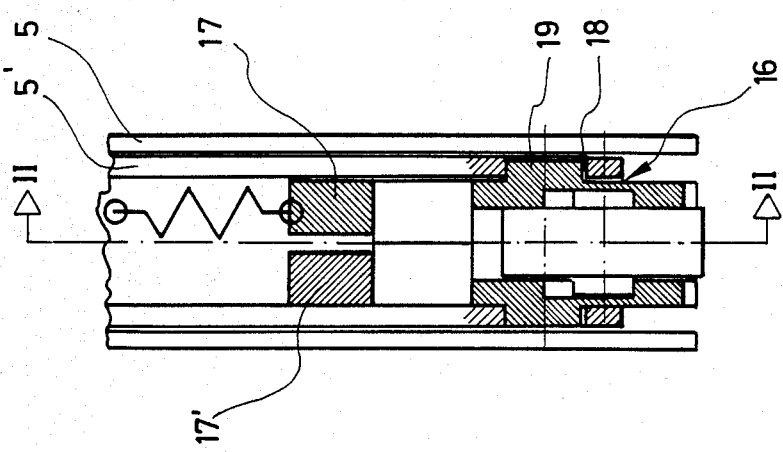
Figure 4:
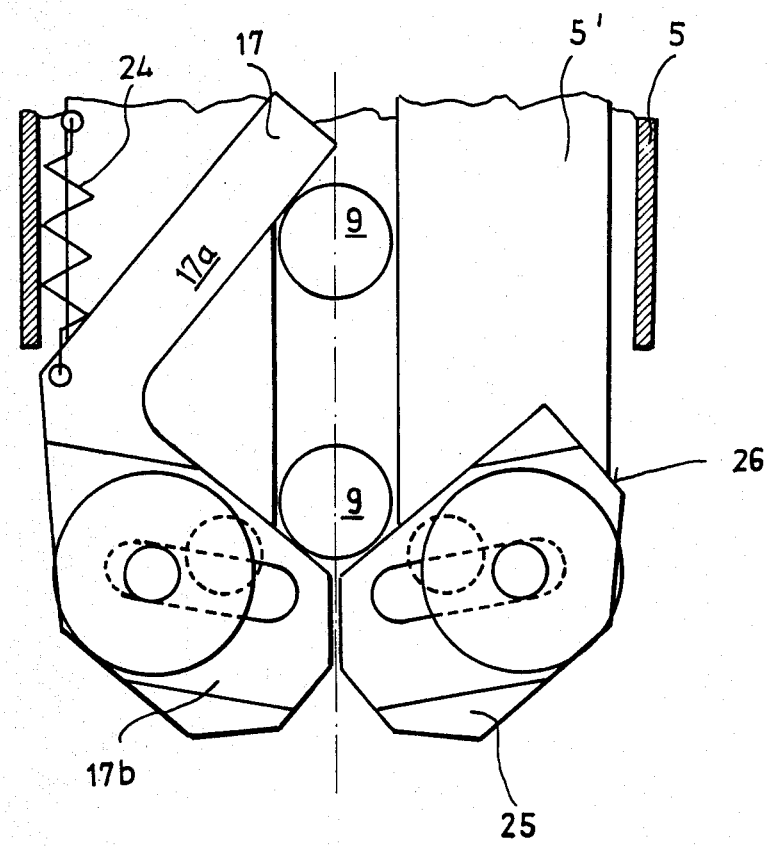

In the following, an embodiment of the invention will be explained in detail on the basis of the drawings in which FIG. 1a shows a schematic representation of a front view of the field of application of the invention, FIG. 1b shows a side view of the representation of FIG. 1a, FIG. 2 shows a sectional view of the device according to the invention, FIG. 3 shows the section III—III of FIG. 2, FIG. 4 shows a representation similar to that of FIG. 2 in a different position of the device according to the invention, and FIG. 5a to f show a schematic representation of the sequences of movements carried out by the device according to the invention.

FIG. 1a and 1b show in a schematic representation a part of a device for laying out a bale of cloth on a layout table. The device is provided with two pairs of longitudinal rails 1 and 2, which are arranged in parallel juxtaposed relationship with one another and in the case of which the longitudinal rail pair 1 extends on the inside and the longitudinal rail pair 2 on the outside. Both pairs of longitudinal rails can have a cross-section of the type normally used in the case of such rails. The figures show an inverted Y-shaped profile with roller pairs 3 and 4 running on the respective legs thereof. Two roller pairs 3 of the inner pair of longitudinal rails 1 respectively have attached thereto a vertical suspension carrier 5 via bow means 6. The suspension carriers 5 at each of the longitudinal rails 1 are fixedly coupled with each other via a crossbar 7. Each of the suspension carriers 5 is provided with a hollow profile, which has a box-shaped cross-section and in the interior of which a member 5' is mounted which is adapted to be extended after the fashion of a telescope. Telescope mountings are commonly used in practice to such an extent that they need no longer be described. The interior of the suspension carrier 5 has additionally provided therein drive means for the extendable member 5', which may, for example, comprise a hydraulic cylinder, an electric motor or a hand-operated mechanical drive. In the lower end of the extendable member 5' there is provided a two-part bearing means 8 for rotatably mounting a winding shaft 9 of a bale of cloth 10, said bearing means 8 being designed as a gripping device. The two parts 8a and 8b of the bearing means 8 are arranged at a distance from each other on both sides of a slot 11 extending through the whole member 5' in the direction of the winding shaft 9 to be received. Also the suspension carrier 5 includes in an expedient manner a slot 12 corresponding to the slot 11 so that the member 5' with the winding shaft 9 can be fully retracted into the suspension carrier 5.

On the pair of longitudinal rails 2, trolleys 13 run on one respective roller pair 4 on both sides in juxtaposition with the suspension carriers 5. The trolleys 13, only one associated pair of which is shown in the drawing, comprise a vertical holding rod 14 which—at the end facing away from the rollers 4—is provided with a point of support for the winding shaft 9, said point of support having the form of a hook 15. In the vicinity of the hook, the holding rod 14 is offset such that the winding shaft 9 is positioned perpendicularly below the rollers.

The point of support of the winding shaft 9 in the hook 15 is positioned below the bearing means 8 in spaced relationship therewith when the member 5' has been fully retracted in the suspension carrier 5. The distance can be varied depending on the structural requirements and the future intended use of the device.

As can be seen from FIG. 1a, the winding shaft 9 projects beyond the bale of cloth 10 at both sides thereof to such an extent that the hooks of the trolleys 13 can act on the winding shaft 9 at the outer ends thereof and that the bearing means of the suspension arms 5 can act on said winding shaft 9 between the hooks 15 and the bale of cloth 10.

On the basis of FIGS. 2 to 4, the bearing means 8, which is designed as a gripping device, will now be described in detail.

FIG. 2 shows a longitudinal section through the lower free end of one of the suspension carriers 5 with the extendable member 5'. The extendable member 5' consists of e.g. U-sections or of four mutually spaced struts or of solid material or of a box-shaped profile, which have provided therein from below the slot 11 for receiving the winding shaft 9 as well as a slot 16 for receiving the two parts 8a and 8b of the bearing means 8, said slot 16 extending centrally, at right angles to said slot 11 and also through the whole member 5'. The bearing means 8 includes two identically designed bent levers 17 and 17', which are rotatably supported in struts of the member 5' by means of a pivot 19 engaging a hole 18 in said member 5', said struts being arranged diagonally to each other. Each bent lever 17,17' comprises a first lever arm 17a extending horizontally in a first position and a second lever arm 17b extending essentially at right angles to said first lever arm. The lever arm 17b is provided with the pivot 19 and, at the side facing away from the pivot 19, it is provided with an elongate opening 20. An axle 21 is displaceably supported in said opening 20. Said axle 21 carries a roll 22 adapted to be rotated either about the axle 21 or with said axle in the elongate opening 20. The elongate opening 20 extends from a lower limit, at which the center line of the axle 21 is positioned essentially perpendicularly below the center line of the pivot 19, at an oblique angle upwards and outwards away from the winding shaft 9. The angle included by the center line of the elongate opening 20 and by the vertical center line extending through the winding shaft 9 is approx. 35° to 60°, preferably 40° to 45°. The opening 20 is arranged in a guide path 23, which is provided in the form of a recessed surface in the lever arm 17b and the boundaries of which extend parallel to the elongate opening 20, said guide path 23 having a width which slightly exceeds the diameter of the roll 22 so that said roll 22 can rotate without hindrance when displaced along the opening 20. The guide path 23 has a depth exceeding only slightly half the width of the roll 22. Outside of the vertical center line of the pivot 19 a helical spring 24 is articulated on the lever arm 17a. The articulation can be effected, in the manner known, by an incorporated or screwed-on loop or a through-hole. The other end of the spring 24 is, in an expedient manner, connected to the strut of the member 5' which also supports the pivot 19 of the respective bent lever 17. The fastening can, for example, be effected by means of attachment to a screw which has been screwed into a base.

The respective other struts of the member 5', which extend diagonally as well, but which are not provided with said bent levers 17, have provided thereon rotary plates 25 which are designed in the same manner as the lever arm 17b of the bent lever 17. Also said rotary plates 25 are provided with a pivot 19', which is in alignment with the pivot 19, and with an elongate opening 20' in which the axle 21' of a second roll 22' is received such that it is displaceable therein. The opening 20' is incorporated in a guide path 23' in an analogous manner. The rotary plate 25 is provided with a stop surface 26 for the lever arm 17a of the bent lever 17, said stop surface being located at the top in the position shown in FIG. 2. In addition, the lever arm 17b and the rotary plate 25 are provided with suitably designed contact surfaces 27 and 27', respectively, which, when the device is being assembled, are brought into contact with correspondingly designed contact surfaces of the countermember. However, the bent levers and rotary plates, which are disposed opposite one another and which are used for the purpose of guiding a roll 22, can also be fastened by means of screws. The contact surfaces 27 prevent tilting of the respective parallel members and they prevent the rolls 22 and 22' from becoming wedged.

With the aid of the bearing means 8 the winding shaft 9 can be taken hold of and released again in the manner which will be described hereinbelow on the basis of FIG. 4 as well as FIG. 5a to 5f.

In FIG. 5a, a winding shaft (with a bale of cloth 10 which is not shown) has been moved to a position vertically below the bearing means 8 e.g. by means of the trolleys 13. The bearing means is in the closed position shown in FIG. 2. As can be seen from FIG. 5b, the extendable member 5' is now extended downwards until the winding shaft 9 contacts the surface of the rolls 22 and 22'. During further extension of the member 5', the rolls are displaced upwards in the elongate openings 20 and 20' via their axles 21 and 21' opening thus the slot 11. Hence, the bearing means 8 can be moved beyond the winding shaft 9 to such an extent that the rolls 22 are disengaged from the winding shaft 9 and drop, due to their own weight, back into the lower, first position of their axles 21 and 21', respectively, in said openings 20 and 20', respectively. When, as can be seen from FIG. 5c, the extendable member 5' is again retracted into the suspension carrier 5, the winding shaft 9 rests on the upper side of the rolls 22' in such a way that, due to the weight of the winding shaft 9 and of the bale of cloth 10, the rolls 22 and 22' are held in their lower contact position in the openings 20 and 20', said rolls 22 and 22' projecting into the slot 11 to such an extent that the winding shaft 9 is prevented from falling through.

Unloading is effected in accordance with the sequence of actions shown in FIG. 5d to 5f. The first step is that the extendable member 5' is again extended beyond the suspension carrier 5 to such an extent that the winding shaft 9 lies e.g. in the hooks 15 of the trolleys 13. When the extendable member 5' is being moved further downwards, the bent levers 17 and, consequently, also the rotary plates 25 are entrained until they reach the position shown in FIG. 4. In the case of such a rotation of the bent levers 17, the elongate openings 20 and 20' are rotated to an almost horizontal position, which has the effect that the rolls 22 and 22' are already slightly displaced from their lower positions in said openings 20 and 20'. The lower parts of the lever arms 17b and of the rotary plates 25 project into the slot 11 up to a point at which they are almost in contact with each other. During the movement of the bent levers 17 and 17', respectively, the helical spring 24 exceeds its dead point and slackens again, said helical spring still holding the bent lever 17 in the position, which originated from the displacement of the winding shaft 9, when the winding shaft 9 again moves downwards relative to the bearing means 8 due to a subsequently following retraction of the member 5' into the carrier 5. It will be expedient to provide stop means—which are not shown in the drawings—for the bent levers 17, said stop means preventing the winding shaft 9 from moving beyond the bent lever 17a.

As will be evident from FIG. 5e, the continued upward motion of the member 5' produces the effect that the winding shaft 9 is first pressed onto the rolls 22 and 22', which will evade this resistance by a displacement of their axles 21 and 21' in the still almost horizontally positioned openings 20 and 20' and open the passage. The winding shaft 9 additionally comes into contact with the bent levers 17b and the rotary plates 25 projecting into the slot 11 so that these parts are returned to the positions shown in FIG. 5f, in the course of which process the spring 24 again exceeds its dead point. During snapping back, the displaceable member 5' has already moved upwards to such an extent that the winding shaft 9 is released from the bearing means 8. Due to their own weight, the rolls 22 and 22' fall back into the first position in which they partially project into the slot 11.

The invention is not limited to the embodiment described and shown hereinbefore. If, for example, the slot is provided with a sufficient width, it is also possible to design only part of the bearing means such that it is adapted to be displaced. In addition, the displaceability can be achieved by the measure of arranging the rolls in four simple circular rotary plates, which are each provided with an elongate opening and which are supported directly in the extendable member; for the purpose of unloading the winding shaft, said rotary plates must, however, be rotated by hand.

We claim:

1. A device for releasably suspending a winding shaft for a bale of cloth, comprising:
    at least one suspension carrier provided with a downwardly extendable member, said downwardly extendable member containing a slot having a downwardly extending opening and being dimensioned to receive said winding shaft;
    bearing means for rotatably supporting said winding shaft when it is inserted into said slot, said bearing means having first and second components arranged at opposite sides of said slot, at least one of said components being mounted for transverse movement relative to said slot from a first position to a second position such that in said first position said at least one component extends into said slot below said winding shaft when said shaft is inserted into said slot, the distance between said components then being smaller than the diameter of said winding shaft, the distance between said components being greater than said diameter in said second position;
    means for releasably locking said at least one of said components in said first position, so that said winding shaft is able to be supported by said components when said at least one component is in said first position and to be released from said components when said at least one component is in said second position.

2. A device according to claim 1 wherein said first and second components each comprise a roller disposed on one side of said slot, at least one of said rollers having an axle extending therethrough, said axle being movably supported on either side of said roller in an elongated opening.

3. A device according to claim 2, wherein said elongated opening extends angularly upward from a first lower end thereof near said slot to an upper second end thereof remote from said slot, said first position being determined by said axle of said roller abutting said lower end of said elongated opening.

4. A device according to claim 3, wherein said elongated opening is provided in a rotatably supported member.

5. A device according to claim 4, wherein said rotatably supported member is rotatably connected to said extendable member and is constructed so as to be locked in position.

6. A device according to claim 5, wherein said rotatably supported member is a bent lever having first and second arms constructed so that, at least in said first position of said at least one component of said bearing means, said first arm projects into said slot above said winding shaft, said second arm being provided with said elongated opening, and said bent lever being mounted for pivotal movement about an axle arranged in said second arm.

7. A device according to claim 6 wherein, in said second position of said at least one component of said bearing means, said second arm of said bent lever projects into said slot.

8. A device according to one of the claims 6 or 7 further comprising a spring, said bent lever being connected to one end of said spring, the other end of said spring being secured to said extendable member.

9. A device according to claim 8, wherein said one end of said spring is connected to said first arm of said bent lever at a location vertically as well as horizontally outside the center line of said axle of said bent lever.

10. A device for releasably suspending a winding shaft for a bale of cloth, comprising:
    at least one suspension carrier including a downwardly extendable member having a slot with a downwardly directed opening dimensioned to receive said winding shaft, said member being retractable to an upper position;
    bearing means for rotatably supporting said winding shaft after it is inserted upwardly into said slot;
    means for mounting said bearing means for lateral motion between a first and a second position with respect to said slot so that, in said first position, said bearing means extends into said slot so as to block the passage of said shaft therethrough and, with said bearing means in said second position, said shaft passes freely along and out of said slot;
    locking means responsive to the position of said downwardly extendable member for releasably locking said bearing means in said first position, when said extendable member is in one of its extended and retracted positions, so that said winding shaft is supported thereby, said bearing means being unlocked when said extendable member is in the other of its positions, so that said bearing means may move to its second position, whereby said shaft is released therefrom.

* * * * *